Jan. 12, 1937.  J. W. B. PEARCE  2,067,284
FLEXIBLE JOINT
Filed Nov. 15, 1934  3 Sheets-Sheet 1

INVENTOR
JOHN W. B. PEARCE.
BY Kwis Hudson & Kent.
Attorneys.

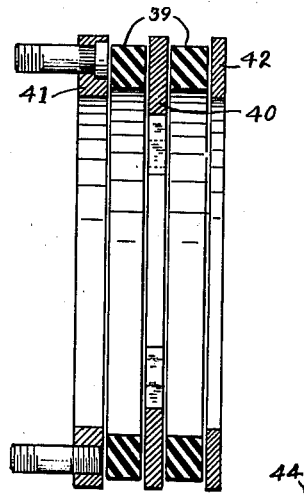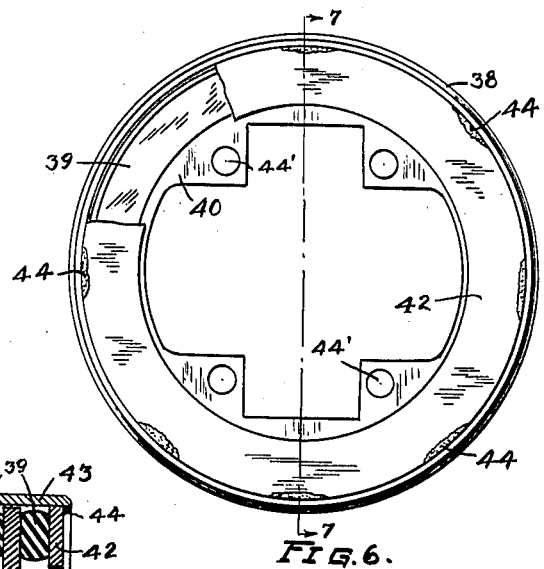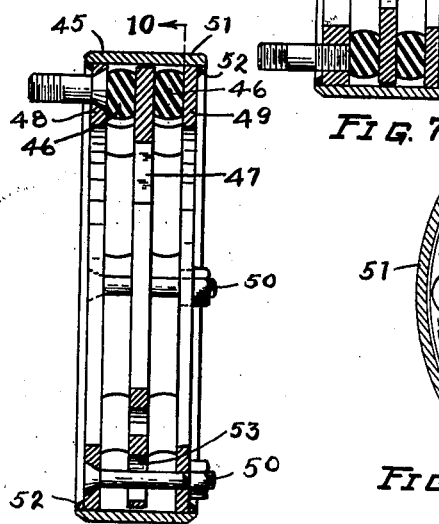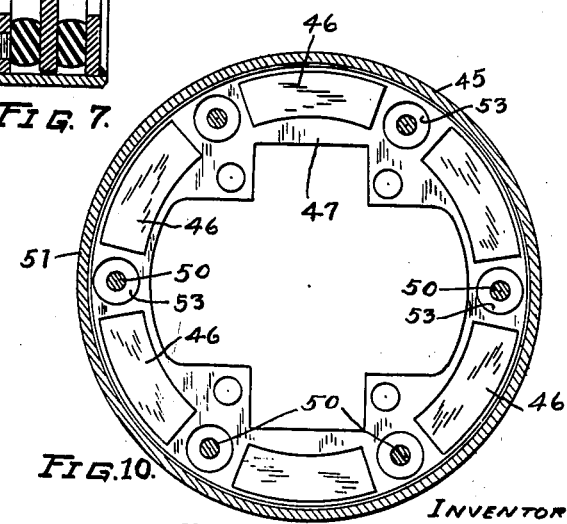

Jan. 12, 1937. J. W. B. PEARCE 2,067,284
FLEXIBLE JOINT
Filed Nov. 15, 1934 3 Sheets-Sheet 3

Inventor
JOHN W. B. PEARCE.
By Kwis Hudson + Kent
Attorneys

Patented Jan. 12, 1937

2,067,284

UNITED STATES PATENT OFFICE 2,067,284

FLEXIBLE JOINT

John W. B. Pearce, Toledo, Ohio

Application November 15, 1934, Serial No. 753,170

3 Claims. (Cl. 64—11)

This invention relates to power transmitting joints, and more particularly to an improved form of flexible joint for power transmitting shafts.

An object of the present invention is to provide an improved flexible joint for power transmitting shafts wherein a body of rubber provides a yielding connection and a vibration absorbing medium through which power is transmitted from one joint member to the other.

Another object of the invention is to provide an improved flexible joint for rotary power shafts wherein a body of rubber is arranged so that the torque is transmitted from one joint member to the other, through the rubber, and the rubber absorbs or dampens objectionable vibrations in the torque as well as shocks due to sudden changes in the magnitude of the torque being transmitted.

Another object of this invention is to provide a flexible joint, of the type referred to, wherein the rubber is connected to the joint members by being vulcanized thereto.

A further object of this invention is to provide an improved flexible joint for rotary power shafts wherein cooperating joint members are provided, respectively, with an annular recess and a flange extending into such recess, and wherein rubber disposed in the recess provides a torque transmitting connection which permits limited relative movement between the joint members and absorbs or smooths out vibrations and sudden shocks in the torque being transmitted.

It is also an object of this invention to provide a flexible rotary shaft joint, of the type referred to, wherein the flange which extends into the annular recess is carried by a universal joint structure having its center lying substantially in the plane of the flange.

Yet another object of this invention is to provide a flexible joint having a ring part and a universal joint structure disposed within the ring part, and wherein rubber flexibly connecting joint members are arranged outwardly of the universal joint structure.

Other objects and advantages of the invention will be apparent from the following description when taken in conjunction with the accompanying sheets of drawings, wherein Fig. 1 is an end view of a simple form of flexible joint constructed according to my invention.

Fig. 6 is an end view, with parts broken away, of the intermediate ring member of my flexible joint.

Fig. 7 is a transverse sectional view thereof taken on line 7—7 of Fig. 6.

Fig. 8 is a sectional view similar to that of Fig. 7, but showing parts of the ring member prior to assembly.

Fig. 9 is a longitudinal sectional view, similar to Fig. 7, but showing another construction for the intermediate ring member.

Fig. 10 is a transverse sectional view taken on line 10—10 of Fig. 9.

In the accompanying drawings, to which detailed reference will now be made, I have illustrated an improved flexible joint for power transmitting shafts wherein bodies of rubber are arranged to connect the joint members and to form a yielding medium through which the power is transmitted, such that objectionable vibrations or shocks due to sudden changes in the magnitude of the power flow will be absorbed and dampened. It will be understood, of course, that the invention may be embodied in various devices and arrangements other than the particular joints herein illustrated and described.

Figure 2:
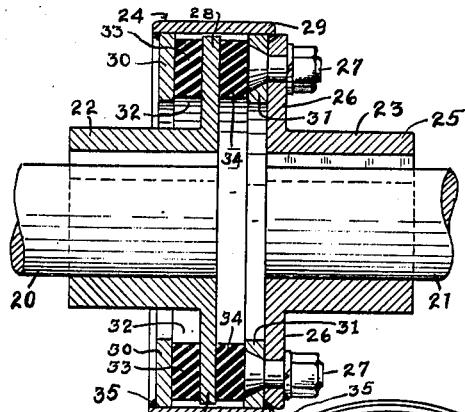
Fig. 2 is a longitudinal sectional view thereof taken on line 2—2 of Fig. 1.
Figure 1:
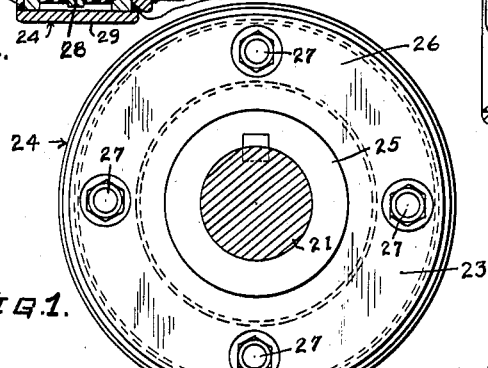

In Figs. 1 and 2 of the drawings I have shown my invention embodied in a joint or connection for a pair of rotary shafts, such as a pair of substantially aligned shafts 20 and 21, through which torque may be transmitted for any desired purpose. My improved flexible connection, as applied to the shafts 20 and 21, comprises joint members 22 and 23 which are connected, respectively, to the adjacent ends of the shafts and an intermediate ring member 24 which connects the joint members 22 and 23.

The joint members 22 and 23 may be of varying construction and may be connected to the power transmitting shafts in any convenient manner. When these joint members are constructed with a hub portion 25, as in this instance, they may be conveniently connected to the shafts by being keyed thereon. The joint member 23 may be provided with a substantially radially extending annular flange 26 which may be connected to the intermediate ring member 24 by means of an annular series of bolts 27. The joint member 22 is provided with a substantially radially extending flange part 28 which cooperates with the intermediate ring member 24 in a manner to be presently explained.

The intermediate ring member 24 may also be of varying construction, depending upon the character of service the flexible joint is to render and upon the construction and arrangement of the joint members with which it is to be used. In this instance the intermediate ring member 24 is constructed with a tubular outer shell or housing 29 and with substantially radially inwardly extending rings or flanges 30 and 31 adjacent the ends of the tubular shell. The space between the flanges 30 and 31 provides an annular recess 32 into which the flange part 28 of the joint member 22 extends.

To establish a flexible torque transmitting connection between the flange part 28 of the joint member 22 and the intermediate ring member which is carried by the joint member 23, I provide a quantity of soft vulcanized rubber in the annular recess 32. This rubber is connected with the flange 28 and with parts of the ring member 24, preferably the end flanges 30 and 31, so that the power being transmitted is transmitted through the rubber. The rubber may be in the form of rings 33 and 34 which are disposed on opposite sides of the flange 28, or may be in some other suitable form, such as the annularly spaced series of blocks to be described hereinafter.

The rubber rings 33 and 34 are connected with the opposite surfaces of the flange 28 and with the surfaces of the flanges 30 and 31 which form the end walls of the annular recess 32. This connection between the rubber and the flange 28, and between the rubber and the flanges 30 and 31, may be formed in various ways, for example it may be provided by the rubber being vulcanized to the flanges, or by the rubber being maintained under compression in the annular recess and thereby frictionally connected to the flanges. If desired, the strength of such a connection may be increased by changing the surface characteristics of the flanges so as to increase the coefficient of friction between the rubber and the metal, as will be explained hereinafter. Instead of forming this connection by means of vulcanization or by surface friction between the rubber and the metal, it can be formed, as will be explained hereinafter, by providing irregularities on the flanges with which the rubber bodies cooperate to establish a mechanical interlock between the rubber and the flanges. It should be understood also that when the rubber is connected to the joint members by vulcanization or by a mechanical interlock, as mentioned above, the rubber may if desired, also be maintained under compression.

The intermediate ring member 24 of my flexible joint may be constructed in any suitable way, for example the tubular shell 29 may be shrunk onto the flanges 30 and 31, and in addition, the shell may be connected to the flanges by spaced welds 35. Thus the flanges 30 and 31 are retained in spaced relation, such that the rubber bodies 33 and 34 cooperate properly with the flanges 28, 30 and 31 either by the rubber being compressed into frictional connection with the flanges or by its being vulcanized thereto. It will be understood, of course, that in assembling the parts of the intermediate ring member 24, the bolts 27 will be inserted through suitable openings in the flange 31 before the rubber is connected to the flanges by compression or vulcanization.

In Figs. 6, 7 and 8 of the drawings I have further illustrated the construction of an intermediate ring member 38 which is similar to the intermediate ring member 24 of Fig. 2. Fig. 6 shows the completed ring member with the bodies of rubber in the form of annular rings 39 disposed on opposite sides of a disk or flange part 40. Fig. 8 shows the rubber rings arranged between the flange part 40 and the end flanges 41 and 42 before the rubber is connected to the metal. Figs. 6 and 7 show the parts after assembly, with the rubber rings 39 compressed between the flange part 40 and the end flanges 41 and 42. The end flanges 41 and 42 are held in spaced relation to retain the rubber under compression by the tubular outer shell 43. This outer shell may be connected to the end flanges 41 and 42 by a shrink fit thereon and also by spaced welds 44. Bolts 43' are provided for connecting the ring member 38 with a joint member and holes 44' in the flange part 40 accommodate bolts for connecting a joint member to the latter part.

As mentioned above, the rubber providing the flexible connection between the joint members may be in the form of annularly spaced blocks and, in Figs. 9 and 10, I show an intermediate ring member 45 having an annular recess in which the rubber is arranged in this manner, that is to say, in a series of annularly spaced blocks 46 disposed on opposite sides of a flange part 47 which extends into the recess. The rubber blocks may be maintained under compression between the flange part 47 and the end flanges 48 and 49 to thereby provide the desired frictional connection between the rubber and the metal surfaces. The compressive force may be applied to the rubber blocks by means of annularly spaced bolts 50 which extend through and exert a clamping action on the end flanges 48 and 49, and also by the outer tubular shell 51 retaining the end flanges 48 and 49 in the desired position. The shell 51 may be connected to the end flanges by a shrink fit and also by spaced welds 52. To provide for the limited relative movement, which is permitted between the flange part 47 and the flanges 48 and 49 by the flexing of the rubber, the flange part 47 may be provided with oversize openings 53 or slots which accommodate the bolts 50, as shown in Fig. 10.

Figure 11:
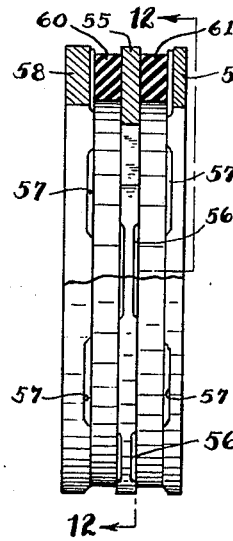
Fig. 11 is a side elevation, with parts broken away, showing another arrangement of elements for the intermediate ring member prior to assembly.
Figure 12:
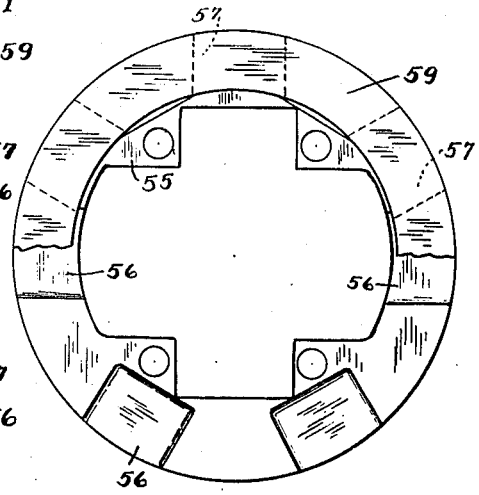
Fig. 12 is an end view further illustrating this arrangement, the view being taken as indicated by line 12—12 of Fig. 11.

The connection between the rubber and the metal may be strengthened in various ways, for example, the adjacent faces of the flange part and the end flanges of the intermediate ring member may be provided with irregularities with which the rubber cooperates. For example, in Figs. 11 and 12 I show a flange part 55, similar to the flange part 28 of Fig. 2, provided with indentations 56 at circumferentially spaced points. Similar indentations 57 are formed in the end flanges 58 and 59 which correspond with the end flanges 30 and 31 of Fig. 2. When the rubber rings 60 and 61 are placed under compression, the rubber is forced into the depressions 56 and 57 and the portions between the depressions are forced into the rubber rings. This interconnection between the rubber and metal increases the resistance to slippage between cooperating surfaces of the metal parts and the rubber bodies.

Figure 13:
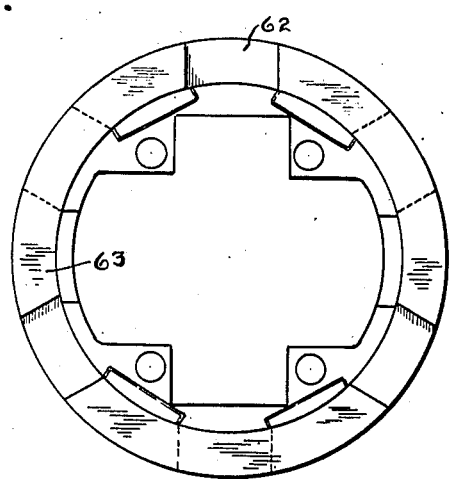
Fig. 13 is a detached plan view of the flange or disk part of one of the intermediate ring members.
Figures 14, 18, 19:
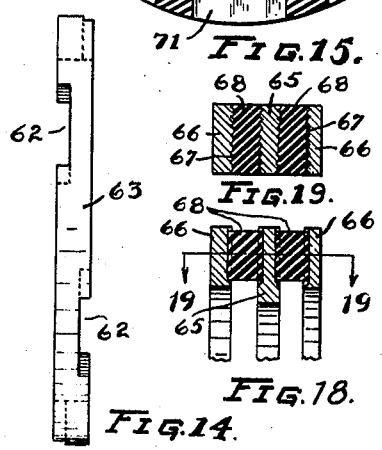
Fig. 14 is an edge view thereof.
Fig. 18 is a partial sectional view showing another construction for the elements of the intermediate ring member.
Fig. 19 is a sectional view taken on line 19—19 of Fig. 18.

The desired connection between the rubber bodies and the metal parts of the intermediate ring member may also be established by providing the metal parts with recesses into which blocks of rubber, similar to the blocks 46 of Figs. 9 and 10, may be seated. In Figs. 13 and 14 of the drawings I have shown such recesses 62 formed in a flange part 63 which corresponds with the flange part 55 of Fig. 11. It will be understood, of course, that similar recesses would be formed in end flanges corresponding with the end flanges 58 and 59 of Fig. 11, and the rubber blocks would be disposed in the recesses and retained therein by axial pressure.

The connection between the rubber and the metal may be strengthened in other ways. For example, in Figs. 18 and 19 I have shown adjacent portions of a flange part 65 and end flanges 66 provided with knurling or roughening as indicated at 67. This knurling increases the coefficient of friction between the cooperating surfaces of the metal parts and the rubber bodies 68.

Figure 16:
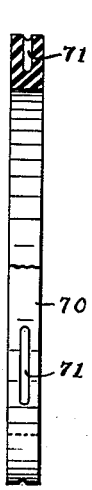
Fig. 16 is an edge view thereof with parts broken away.
Figure 15:
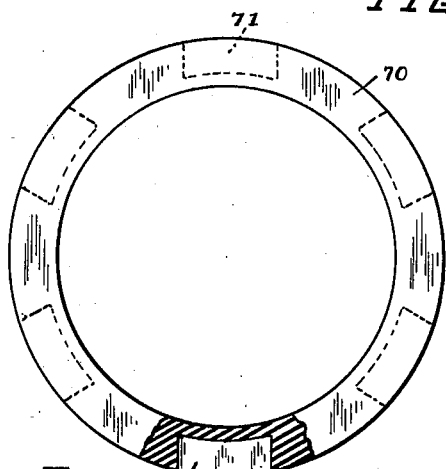
Fig. 15 is a detached plan view, with parts broken away, showing one of the rubber bodies of my flexible joint.
Figure 17:
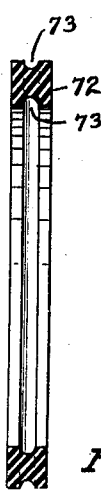
Fig. 17 is a sectional view showing one of the rubber bodies but illustrating another form thereof.

The degree of flexibility desired may be different for different joints and may be varied by varying the flexibility of the rubber which is used in the joints. This may be accomplished in various ways, for example, by varying the composition of the rubber, or by varying the cross sectional shape of the rubber bodies. In Figs. 15 and 16 I have shown how the flexibility of a rubber ring 70 may be increased for use in my flexible joint by reducing the cross sectional area of the ring at a plurality of points, such as by forming pockets or recesses 71 in the ring. These pockets may be conveniently formed in the rubber ring by suitably arranged cores associated with the vulcanizing mold. In Fig. 17 I have shown a rubber ring 72 having grooves 73 formed in the inner and outer peripheries thereof. The formation of such grooves in the inner surface or outer surface, or both, of the ring 72 reduces the cross sectional area thereof and hence increases the flexibility of the ring for use in my flexible joint.

Figure 3:
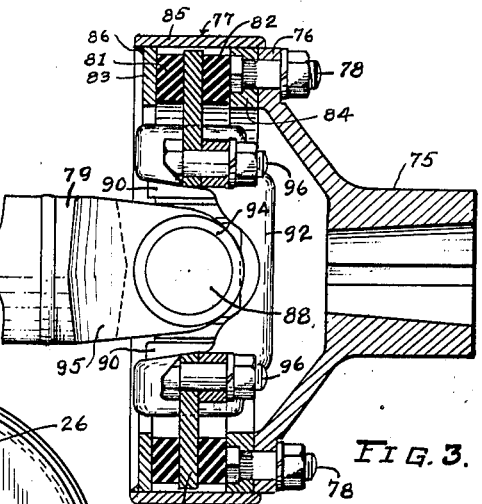
Fig. 3 is a longitudinal sectional view of another flexible joint constructed according to my invention.
Figure 5:
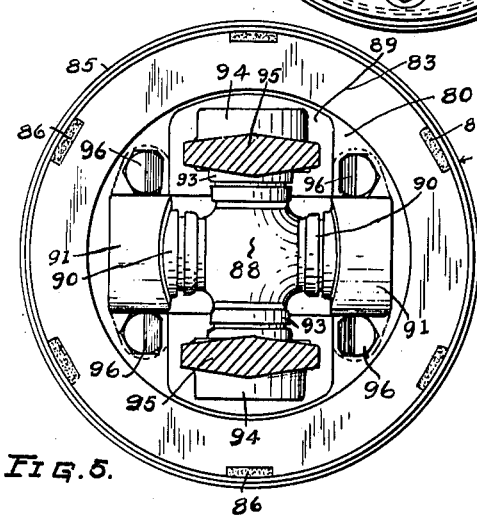
Fig. 5 is a transverse sectional view of the same joint taken as indicated by line 5—5 of Fig. 4.
Figure 4:
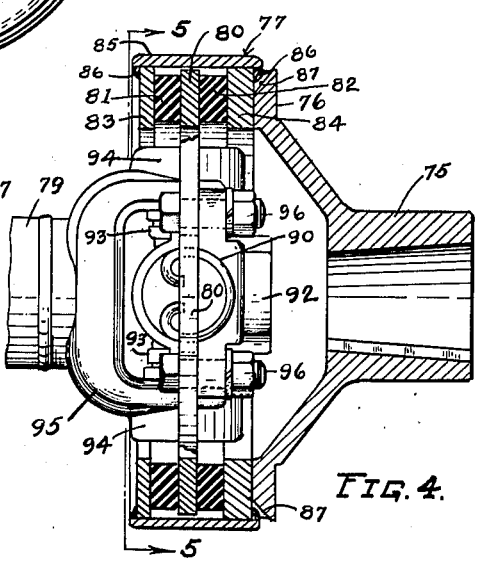
Fig. 4 is a longitudinal sectional view of the same joint, but taken at 90° from the sectional view of Fig. 3.

In Figs. 3, 4 and 5 of the drawings I have shown a flexible joint embodying my invention and which is generally similar to the flexible joint shown in Figs. 1 and 2, with the exception that one of the joint members comprises a universal joint structure. In this latter form of my device, a joint member 75 has a flange part 76 to which an intermediate ring member 77, similar to the intermediate ring member 24 of Fig. 2, is connected by annularly spaced bolts 78. A joint member 79 in the form of a universal joint structure carries a disk or flange part 80 which extends outwardly into the annular recess of the ring member 77. Bodies of rubber 81 and 82, preferably in the form of rings, are disposed between the flange 80 and the end flanges 83 and 84 of the ring member 77, and are connected to these parts preferably by a frictional connection established by maintaining the rubber under compression. A tubular casing or shell 85 is connected to the end flanges 83 and 84 by a shrink fit thereon and by spaced welds 86 whereby the end flanges are maintained in proper relation to hold the rubber in the compressed state. Interference between the welds 86 and the flange 76 of the joint member 75 may be avoided by providing spaced recesses 87 at the edge of the flange to accommodate the welds.

The universal joint structure forming the joint member 79 may be of any desired construction and, in this instance, I show a universal joint of the cross type, the cross 88 being accommodated in an opening 89 formed in the disk or flange part 80. One pair of trunnions 90 of the cross extend into bearing cups 91 of a yoke 92, and the other pair of trunnions 93 of the cross extend into bearing cups 94 which are carried by a yoke 95. The yoke 92 is connected to the disk member 80 by means of the bolts 96 and is so designed that the axes of the trunnions 90, and hence the center of the universal joint, lie substantially in the central plane of the disk. As seen in Fig. 3 of the drawings, the yoke 92 with which a power shaft may be connected, lies on the same side of the disk 80 as the joint member 75. The yoke 95, which is connected to the trunnions 93, lies on the other side of the disk member 80 and extends oppositely to the joint member 75 for connection with a power shaft or other part.

It will be seen from the arrangement just described that since the axes of one pair of trunnions of the universal joint lie in the plane of the disk or flange part 80, the parts will remain in a balanced condition and there will not be a tendency for the intermediate ring member 77 to rotate with a gyratory or wabbling action during the operation of the device. It will also be seen that by having the cushioning and connecting rubber arranged in the intermediate ring member, the universal joint structure can be located within the ring, and a very compact and efficient construction is thus provided.

In the flexible connections which I have described above, it will be noted that the flange or disk part which extends into the annular recess of the intermediate ring member, is made somewhat smaller than the shell or casing of the intermediate ring member so that the limited relative movement, which is permitted between these parts by the flexing of the rubber, can take place.

In all of the flexible joints which I have illustrated and described, the rubber provides the sole connection between the joint members and, during the operation of these flexible joints, the power is transmitted through the rubber with the rubber being subjected to only a shearing stress. Flexing of the rubber is permitted by the arrangement of the parts and, during the operation of the joints, objectionable vibrations as well as shocks due to sudden changes in the power flow, are absorbed by such flexing of the rubber. It will, therefore, be seen that when power is transmitted through my improved flexible joint a relatively smooth and even flow of power will be delivered.

In the specification and claims I have mentioned "rubber" as the flexible medium which connects the joint members and through which the power is transmitted, and I wish it to be understood that I intend the term "rubber" to include any or all of the various rubber-like substances.

While I have illustrated and described the flexible joints of my invention in a detailed manner, it will be understood, of course, that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. In combination, a joint member having a part provided with an annular recess, a disk having the outer portion thereof extending into said recess, a second joint member comprising a universal joint structure connected with said disk and provided with trunnions having their axes lying substantially in the plane of said disk, and bodies of rubber in said recess on opposite sides of said outer disk portion, said rubber being connected with said disk and walls of the recess by being vulcanized thereto.

2. In combination, a joint member having a ring part provided with an annular recess therein opening inwardly toward the axis of rotation, a flange part disposed in the opening of the ring part with the outer portion of the flange part extending outwardly into said annular recess, a universal joint structure connected with said flange part and having its center lying substantially in the plane of said flange part, and bodies of rubber disposed in said annular recess of the ring part on opposite sides of said outer portion of the flange part, the rubber having connection with the ring part and with said flange part and providing a yieldable torque transmitting connection therebetween.

3. In combination, a joint member having a ring part provided with an annular recess opening inwardly toward the axis of rotation, a disk disposed in the opening of the ring part and having the outer portion thereof extending outwardly into said annular recess, a second joint member comprising a universal joint structure connected with said disk and provided with trunnions having their axes lying substantially in the plane of the disk, and bodies of rubber in said annular recess on opposite sides of said outer disk portion, said rubber being connected with said disk and with the walls of the annular recess and providing a yieldable torque transmitting connection therebetween.

JOHN W. B. PEARCE.